United States Patent [19]

Smith

[11] 4,341,289
[45] Jul. 27, 1982

[54] DISC BRAKES

[75] Inventor: George W. Smith, Studley, England

[73] Assignee: Lucas Industries Limited, Birmingham, England

[21] Appl. No.: 74,532

[22] Filed: Sep. 11, 1979

[30] Foreign Application Priority Data

Sep. 25, 1978 [GB] United Kingdom ............... 38065/78
Jun. 11, 1979 [GB] United Kingdom ............... 7920204

[51] Int. Cl.$^3$ .......................................... F16D 55/224
[52] U.S. Cl. ............................... 188/73.39; 188/73.45; 188/73.47
[58] Field of Search ............... 188/73.32, 73.39, 73.43, 188/73.45, 73.47

[56] References Cited

U.S. PATENT DOCUMENTS

| | | | |
|---|---|---|---|
| 3,363,727 | 1/1968 | Thirion | 188/73.4 |
| 3,388,774 | 6/1968 | Burnett | 188/73.5 |
| 3,712,422 | 1/1973 | Haraikawa et al. | 188/73.4 X |
| 3,782,510 | 1/1974 | Rath | 188/73.5 X |
| 3,887,045 | 6/1975 | Dettoff et al. | 188/73.3 |
| 3,889,785 | 6/1975 | Hori | 188/73.3 |
| 3,915,263 | 10/1975 | Courbot | 188/73.3 X |
| 3,920,104 | 11/1975 | Hoffmann | 188/73.3 |
| 3,952,840 | 4/1976 | Yamazaki et al. | 188/73.4 X |
| 3,970,172 | 7/1976 | De Gennes | 188/73.4 |
| 4,031,986 | 6/1977 | Thompson | 188/73.3 |
| 4,068,745 | 1/1978 | Haraikawa | 188/73.3 |

FOREIGN PATENT DOCUMENTS

| | | | |
|---|---|---|---|
| 2514383 | 11/1975 | Fed. Rep. of Germany | 188/73.3 |
| 1148524 | 4/1969 | United Kingdom | 188/73.3 |

Primary Examiner—George E. A. Halvosa
Attorney, Agent, or Firm—Scrivener, Clarke, Scrivener and Johnson

[57] ABSTRACT

A disc brake assembly comprises a fixed carrier or torque member 2 upon which is mounted by way of pins 14 a clamping or caliper member 13. The opposite sides 16,21 of the caliper 13 are interconnected by integral webs of metal 19,20 which are disposed symmetrically with respect to the central plane of clamp of the assembly and which are the circumferentially extreme of the parts of the assembly which span the periphery of the disc. This enables a relatively large diameter disc to be used and enables the caliper to be made from low grade or light weight material.

4 Claims, 8 Drawing Figures

DISC BRAKES

This invention relates to disc brakes.

Disc brake assemblies are known comprising a carrier member for mounting in a fixed position straddling the periphery of a brake disc; first and second brake pads mounted on the carrier member for engaging opposite faces of the brake disc, the brake pads being located on the carrier member such that drag forces imposed on the pads in use are transferred directly to the carrier member; and a clamping member for forcing the pads towards each other into engagement with the brake disc, the clamping member being slidably mounted on the carrier member for movement parallel to the axis of rotation of the disc. Such disc brake assemblies are shown in British Patent specification Nos. 1,193,641 and 1,381,709.

In the assembly of Specification 1,381,709 the clamping member is of inverted generally U-shaped cross section. Whilst the disc brake assembly illustrated in the Specification has proved highly satisfactory for motor cars, it cannot be used for heavy commercial vehicles since the U-shaped clamping member cannot be made sufficiently strong to resist adequately the forces which in use tend to spread the legs of the U apart.

In the assembly of Specification 1,193,641 corresponding to U.S. Pat. No. 3,656,590, the chordal beams of the clamping member are secured to each other by tie-rods passing through clearance holes in the carrier member. Whilst this method of connecting the two sides of the clamping member avoids the spreading problem associated with a U-shaped clamping member, it is not entirely satisfactory for heavy vehicle application since the diameter of disc with which the assembly can be used is limited by the spacing of the tie-rods, which in turn is limited by the size of the carrier member. Thus, either a relatively small diameter disc must be used which is unsatisfactory for heavy commercial vehicles, or the carrier member must be of a very large size in order for the tie-rods to be spaced sufficiently far apart to accommodate a large diameter disc. Such a large carrier member adds undesirable weight to the brake assembly and increases the cost of the brake assembly.

According to one feature of the present invention there is provided a disc brake assembly for use in combination with a rotating brake disc, comprising: a carrier member for mounting in a fixed position straddling the periphery of the brake disc; first and second brake pads mounted on the carrier member for engaging opposite faces of the brake disc, the brake pads being located on the carrier member such that drag forces imposed on the pads in use are transferred to the carrier member; and a clamping member for forcing the pads towards each other and into engagement with the brake disc, the clamping member being slidably mounted on the carrier member for movement parallel to the axis of rotation of the disc and comprising a first portion located on one side of the disc and including means for forcing the pad located on that side of the disc towards the disc, and a second portion located on the other side of the disc and connected to the first portion by a pair of connecting means, the connecting means when viewed in a direction parallel to the axis of rotation of the disc being disposed substantially symmetrically with respect to the central plane of clamp (as herein defined) of the brake assembly and being the circumferentially extreme of the parts of the brake assembly which span the disc.

The term "central plane of clamp" as used herein means a plane which passes through both connecting means chordally the disc and contains the axis of pressure of the disc assembly, the axis of pressure being the axis along which the force means may be regarded as acting. In the case when the force means comprises a single piston-and-cylinder actuator the axis of pressure will be the axis of the piston. In the case when the force means comprises a pair of identical piston-and-cylinder actuators mounted side-by-side with the axes of the pistons parallel, the axis of pressure will be an axis parallel to the axes of the pistons, and located mid-way between the axes of the pistons.

The location of the connecting means substantially symmetrically with respect to the central plane of clamp reduces bending stresses on the connecting means and accordingly the clamping member can be made sufficiently strong to resist any extreme brake loads and yet can be made smaller and/or of lower grade material.

Preferably, the connecting means each comprise a web of metal integral with the first and second portions of the clamping member.

The location of the connecting means as the circumferentially extreme part of the brake assembly which spans the disc ensures that the maximum diameter of disc can be used for the size of clamping member provided, the size of the disc not being limited by the chordal dimensions of the carrier member.

Whilst certain embodiments of the invention are particularly suited for use with commercial vehicles, the uses of the invention are not limited the heavy vehicles and some embodiments of the invention can be used with advantage in lighter vehicles, for example motor cars.

The above and further features and advantages of the invention will become clear from the following description of preferred embodiments thereof, given by way of example only, reference being had to the accompanying drawings, wherein.

Figure 1:
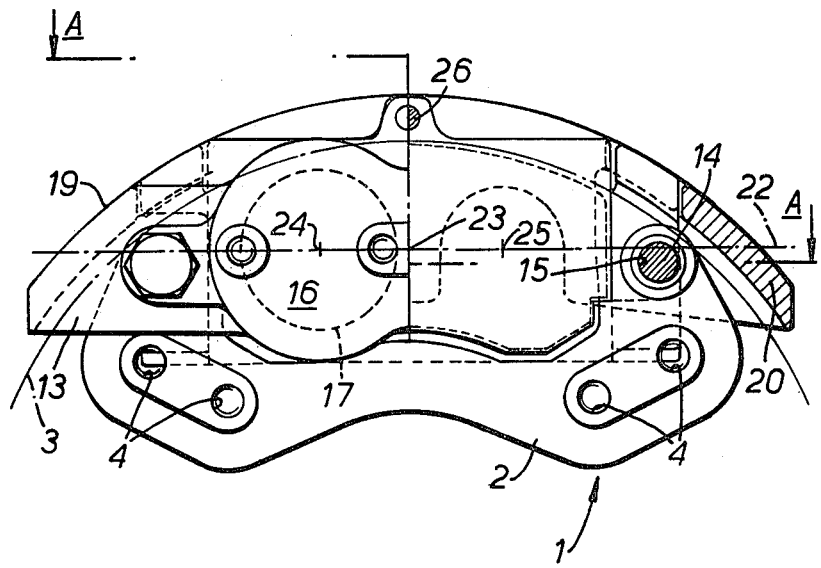
FIG. 1 is an elevational view, partly in section, of a disc brake assembly suitable for use on a commercial vehicle, the section being taken on the line B—B of FIG. 2.

The disc brake assembly 1 shown in FIGS. 1 to 4 comprises a carrier member 2 which in use is mounted on the chassis of a vehicle adjacent a brake disc 3 by means of bolts passing through fixing holes 4. The carrier member includes a bridge portion 5 which overlies the periphery of the disc and connects the main portion of the carrier member in which the fixing holes 4 are formed to a remote portion of the carrier member located on the other side of the brake disc. The portion of the carrier member lying on the opposite sides of the disc are provided with mounting apertures 6,7 in which brake pads 8,9 respectively are slidably mounted for movement towards and away from the disc. The brake pads 8,9 each comprise a friction lining 10 bonded to a steel backing plate 11. The backing plates 11 contact respective abutment surfaces 12 formed on the carrier member to transfer drag or torque forces to which the pads are subjected in use directly to the carrier member, and thus to the chassis of the vehicle.

A clamping member 13 is slidably mounted on the carrier member 2 for movement in the direction parallel to the axis of rotation of the disc by means of pins 14 slidably received in apertures 15 formed in the carrier member. The clamping member comprises a first portion 16 located on the same side of the disc as the fixing holes 4 of the carrier member and including twin hydraulic slave cylinder assemblies 17, the pistons 18 of which abut the backing plate 11 of brake pad 8 to force that brake pad into engagement with the disc when the brakes are applied.

When the brake pad 8 contacts the disc a reaction force is produced on the first portion 16 of the clamping member and this is transferred via connecting means 19,20 to a second portion 21 of the clamping member to force the brake pad 9 into engagement with the opposite surface of the disc. The connecting means 19,20 are arcuate webs formed integrally with the first portion 16 and second portion 21 of the clamping member. The webs are disposed symmetrically with respect to the central plane of clamp 22 of the assembly. The plane 22 passes through both webs chordally of the disc 3 and contains the axis of pressure 23 which is parallel to and mid-way between the axes 24,25 of the slave cylinders 17. The effect of this arrangement is that when the brakes are applied the connecting means 19,20 are loaded mostly in tension. The connecting means are not required to resist large cantilever forces, and are well able to resist the tendancy of the reaction to the braking forces to spread the first and second portions of the clamping member apart.

Figure 2:
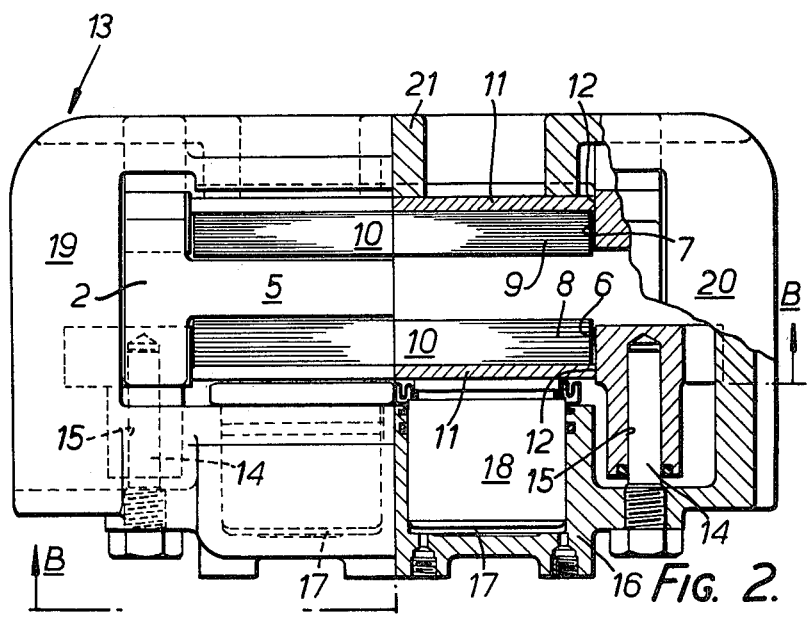
FIG. 2 is a plan view, partly in section, of a disc brake assembly of FIG. 1, the section being taken on the line A—A of FIG. 1.
Figure 3:
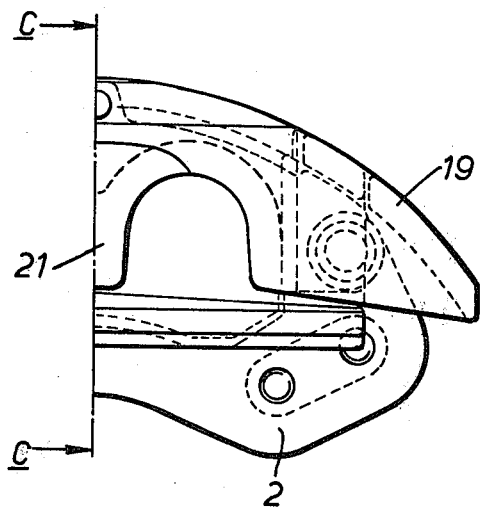
FIG. 3 is a rear view of a portion of the disc brake assembly of FIGS. 1 and 2.

It will be observed from FIGS. 1 and 2 that both the bridge portion 5 of the carrier member and the connecting means 19,20 of the clamping member span the periphery of the brake disc. Considering the circumferential direction of the brake disc, the connecting means 19,20 are located outwardly of the bridge part 5, and are the circumferentially extreme of the parts of the brake assembly which span the disc. The connecting means 19,20 are separated from the periphery of the disc by a small air gap. It should be appreciated again that the diameter of the disc is not limited by the size of the carrier member since the carrier member need not extend beyond or as far as the connecting means, when measured in the circumferential direction. Accordingly, the disc assembly illustrated can be manufactured for use with a large diameter disc without the carrier member becoming prohibitively large.

Figure 4:
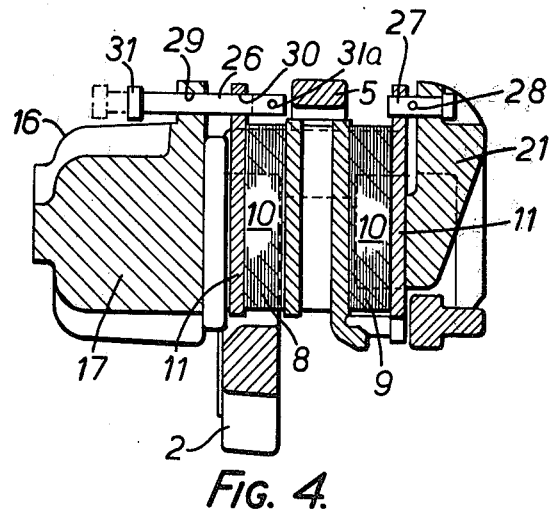
FIG. 4 is a section on the line C—C of FIG. 3.
Figure 5:
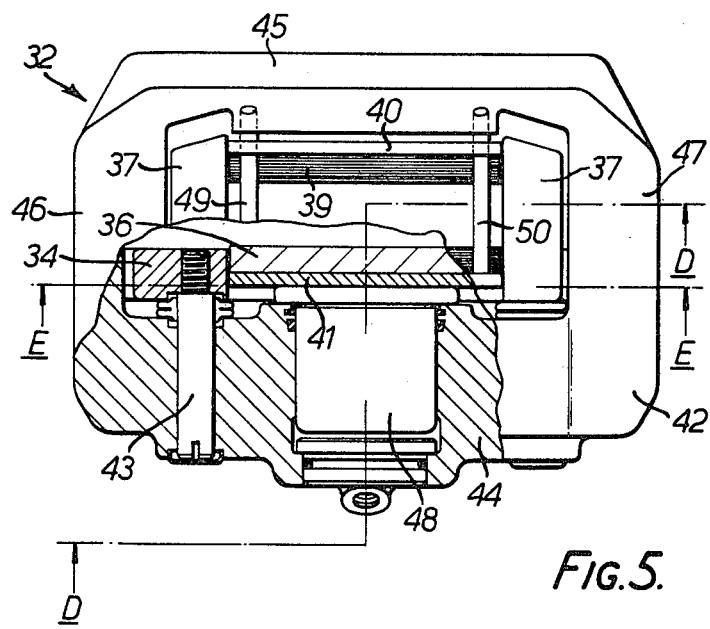
FIG. 5 is a plan view, partly broken away, of a second embodiment of disc brake assembly.
Figure 6:
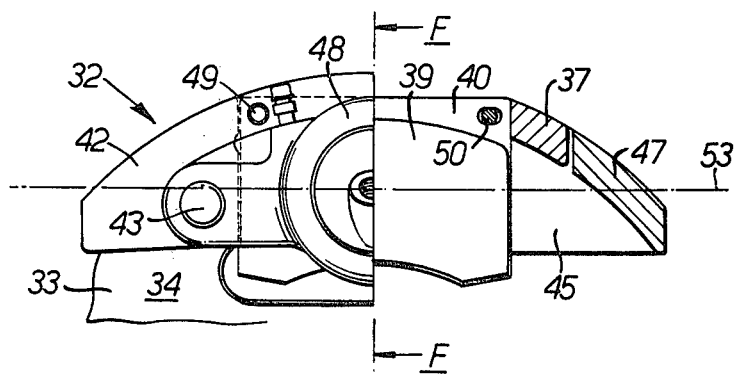
FIG. 6 is an elevational view, partly in section, of the disc brake assembly of FIG. 5, the section being taken on the line D—D of FIG. 5.
Figure 7:
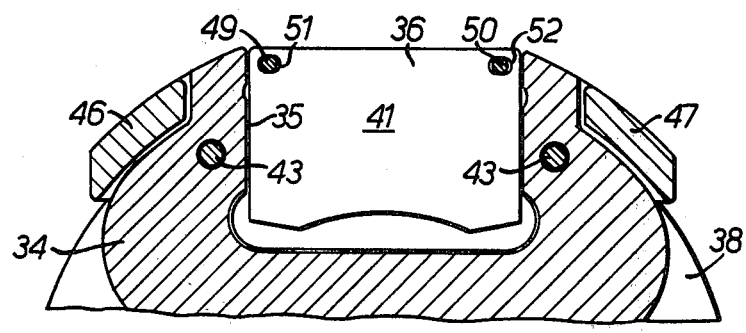
FIG. 7 is a sectional view on the line E—E of FIG. 5.
Figure 8:
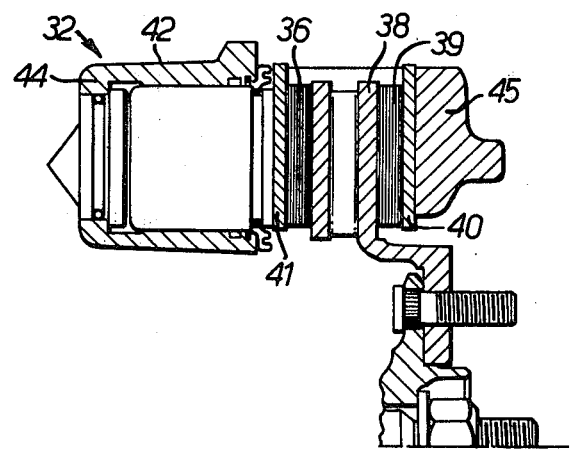
FIG. 8 is a sectional view on the line F—F of FIG. 6.

Referring to FIG. 4 it will be seen that the brake pads 8,9 are held in position by pins 26,27 extending through respective apertures in the first and second portions of the clamping member. In use, the outboard brake pad 9 does not move relative to the second portion 21 of the clamping member, and accordingly the pin 27 need not provide for any relative movement. The pin 27 is accordingly located in a bore in the second portion 21 by a retaining clip 28. The backing plate of the brake pad 9 is formed with a bore to receive the pin 27 as a sliding fit.

As the friction linings 10 wear in use the clamping member moves to the left as viewed in FIG. 4 relative to the carrier member 2. At the same time, the backing plate 11 of the pad 8 moves to the right as viewed in FIG. 4 relative to the carrier member 2. The total relative movement between the backing plate 11 of the brake pad 8 and the adjacent slave cylinders 17 is equal to the sum total of the wear of the friction linings 10 of both brake pads.

In order to ensure that the brake pad 8 is positively located at all times the pin 26 is a sliding fit in a bore 29 in the clamping member and in a bore 30 in the backing plate 11 of the brake pad 8. The pin 26 is retained in position by a head 31 at one end and a retaining clip 31a at the other end. The spacing between the head 31 and clip 31a is sufficient to accommodate the required relative movement between the backing plate 11 of the brake pad 8 and the clamping member.

The initial position of the pin 26 can either be as shown in solid line in FIG. 4 or as indicated by dotted lines. If the initial position is as shown in solid line the pin 26 will tend to move with the clamping member 13 until the backing plate 11 engages the clip 31a. This will occur when approximately half the friction lining material is worn from each pad 8,9. Thereafter the pin 21 will move with the backing plate 11 and slide relative to the clamping member 13. In the case when the initial position of the pin is as shown in broken lines in FIG. 4 the pin 26 will move with the backing plate 11 relative to the clamping member each time there is relative movement between the backing plate 11 and the clamping member. This repetitive movement will help to prevent ceasure of the pin 26.

In a modified arrangement (not shown) the pin 26 is replaced by a pin slidably mounted in a blind bore in the first portion 16 and extending through the bore 30 in the backing plate 11. The pin is biased into contact with the bridge portion 5 by a compression spring located between the end of the pin and the blind end of the bore and has a length sufficient to remain in contact with the bridge portion 5 despite movement of the first portion 16 away from the bridge as the pads wear. In a second modified arrangement (not shown) the pins 26 and 27 are replaced by respective pins rigidly fixed by screw threads to the respective backing plates of the pads and extending through clearance holes in the first and second portions of the carrier member. The pin associated with pad 8 has a length sufficient to permit the necessary relative movement between the pad 8 and the first portion of the carrier member whilst ensuring positive retention of the pad 8 at all times. The pads are removed by unscrewing the pins from the backing plate. In a third modified arrangement (not shown) the pads are retained in position by a thin metal strap which is releasably secured to the first portion 16 and second portion 21 of the carrier member and passes between the bridge portion and the disc. In this arrangement each pad is preferably provided with a shim having a major portion which lies against the backing plate of the pad and which is located relative to the backing plate by means of pips formed on the backing plate which are received in holes in the major portion of the shim. The radially outer end of the shim is bent to form a resilient flange which is engaged by the strap. The arrangement is such that the strap resiliently deforms the flange during assembly and the resulting pre-load force is transferred to the pad via the pips to bias the pad into engagement with its associated guide surfaces to prevent rattling of the pad.

Referring now to FIGS. 5-8 a second embodiment of disc brake assembly 32 is shown. The disc brake assembly 32 is suitable for light commercial vehicles, for example light vans, and for private motor cars.

The disc brake assembly 32 comprises a carrier member 33 comprising a main portion 34 in the form of a web or flange permanently secured, as by welding, to the hub of the vehicle to which the disc brake assembly 32 is fitted. The main portion 34 defines a generally U-shaped opening 35 in which is mounted an inboard brake pad 36. Two arms 37 are cantilevered out from the main portion 34 and span the periphery of the brake disc 38. The arms 37 do not, however, extend radially inwardly beyond the periphery of the disc on the side opposite the main portion 34 of the carrier member.

An outboard brake pad 39, identical to the inboard brake pad 36 is located between the arms 37 with its backing plate 40 in sliding engagement with the arms. The backing plate 41 of the inboard brake pad 36 is in sliding engagement with the sides of the U-shaped opening 35 in the main portion of the carrier member, and accordingly drag or torque forces to which the pads are subjected in use is applied by the backing plates 40,41 directly to the carrier member 33, and thus to the hub of the vehicle.

A clamping member 42 is slidably mounted on the carrier member by means of pins 43 for movement parallel to the axis of rotation of the brake disc 38. The clamping member comprises a first portion 44 located on the same side of the disc as the main portion 34 of the carrier member, and a second portion 45 located on the opposite side of the disc and connected to the first portion by connecting webs 46,47.

The first portion 44 of the clamping member includes a hydraulic slave cylinder assembly 48 the piston of which acts on the inboard brake pads 36. During braking, the reaction force produced by contact of the inboard brake pad with the disc causes the clamping member to slide on the pins 43 so that the second portion 45 of the clamping member brings the outboard brake pad 39 into engagement with the disc.

The brake pads 36,39 are held in position by locating pins 49,50 secured to the clamping member and passing through clearance holds 51,52 in the backing plates 40,41 of the brake pads. In order to remove the brake pads the pins 49,50 are removed and the brake pads are withdrawn radially from the carrier member 33.

It will be noted that the arcuate connecting webs 46,47 are the circumferentially extreme of the parts of the brake assembly 32 which span the disc. Further, the webs 46,47 are disposed substantially symmetrically with respect to the central plane of clamp 53 of the assembly. Accordingly, when the brake is applied the webs 46,47 are loaded mostly in tension as described above with reference to the embodiment of FIGS. 1-4. This enables the clamping member 42 to be manufactured either from relatively thin low grade steel, or from a suitable light weight material, for example aluminium alloy. If the caliper is manufactured of light weight material a steel or other suitable sleeve is preferably provided surrounding the pins 43 in order to give good sliding contact between the clamping member and the pins.

If desired, the disc brake assembly 32 can incorporate a hand brake mechanism, for example as described in British Patent Specification No. 1,284,273.

A further advantage of the disc brake assembly 32 is that it permits relatively easy removal of the brake disc 38 since the carrier member 33 does not extend radially inwardly of the outer periphery of the disc on the outboard side of the disc. Accordingly to remove the disc 38 it is only necessary to remove the pins 43 and ease the clamping member 42 complete with the brake pads 36,39 radially outwardly to a position clear of the outer periphery of the disc. Provided a flexible hydraulic connection is provided to the slave cylinder 48 this can be accomplished without braking the hydraulic connections of the braking system. After the clamping member has been moved radially outwardly sufficiently to clear the outer periphery of the disc, the disc can be removed for inspection re-grinding, or replacement.

I claim:

1. A disc brake assembly for use in combination with a rotating brake disc, comprising: a carrier member for mounting in a fixed position straddling the periphery of the brake disc; first and second brake pads mounted directly on the carrier member for engaging opposite faces of the brake disc, the brake pads being located on the carrier member such that drag forces imposed on the pads in use are transferred directly to the carrier member; and a clamping member for forcing the pads towards each other and into engagement with the brake disc, the clamping member being slidably mounted on the carrier member for movement parallel to the axis of rotation of the disc and comprising a first portion located on one side of the disc and including means for forcing the pad located on that side of the disc towards the disc and operating on said clamping member to move it by reaction in the opposite direction, and a second portion located on the other side of the disc and connected to the first portion by a pair of circumferentially spaced integral connecting means, said second portion engaging the pad located on that side of the disc for forcing same towards the disc upon reaction movement of said clamping member, the connecting means when viewed in a direction parallel to the axis of rotation of the disc being disposed substantially symmetrically with respect to a central plane of clamp of the brake assembly which plane passes through both connecting means and contains the axis of pressure of the disc brake assembly, said connecting means each comprising an arcuate web of metal integral with the first and second portions of the clamping member and being spaced from and closely following the circular periphery of the disc along the entire length of said web to define with the disc periphery a small air gap, said connecting means also defining the circumferentially extreme position of the parts of the brake assembly which span the disc, said first and second portions extending radially inwardly from said arcuate webs in planes parallel to the plane of disc rotation whereby when a substantially radial cross-section taken through a web where said central plane of clamp also passes through said web is viewed in a direction normal to the axis of disc rotation, said web and said first and second portions define an inverted U-shaped, said first and second portions of said clamping member being unconnected apart from the spaced connecting means to define an open top in said clamping member, said carrier member having a bridge portion extending into said open top and there spanning the periphery of the disc, said bridge portion having circumferentially spaced outer edges adjacent respective circumferentially spaced inner edges of the respective connecting means, said bridge portion also having circumferentially spaced inner edges for slidably guiding said brake pads, the circumferential space between said inner edges of said bridge portion on either side of said disc being open to define an open top in said carrier member whereby said pads may be radially withdrawn without removing said clamping member from said carrier member.

2. A disc brake assembly according to claim 1 wherein the bridge portion is an arcuate web of metal which closely follows the periphery of the disc substantially in the plane thereof.

3. A disc brake assembly according to claim 1 wherein the clamping member is slidably mounted on the carrier member by means of a pair of pins, the pins being fixed relative to one of the carrier member and the clamping member, and being slidably received in bores in the other of the carrier member and the clamping member.

4. A disc brake assembly according to any preceding claim wherein the carrier member includes a main portion located to one side of the disc and extending radially inwardly from the periphery of the disc to a fixed mounting, and the part of said bridge portion located to the other side of the disc upon which one of the brake pads is slidably engaged, does not extend inwardly beyond substantially the periphery of the disc whereby after removal of the clamping member the disc can be removed axially without removing the carrier member.

* * * * *